Feb. 19, 1957 L. JOHNSTON ET AL 2,782,254
TAPE MEASURING DEVICE FOR A TELETYPEWRITER
MESSAGE STORING UNIT
Filed Oct. 13, 1953 3 Sheets-Sheet 1

INVENTORS.
LEITH JOHNSTON
RICHARD C. STILES
BY
ATTY.

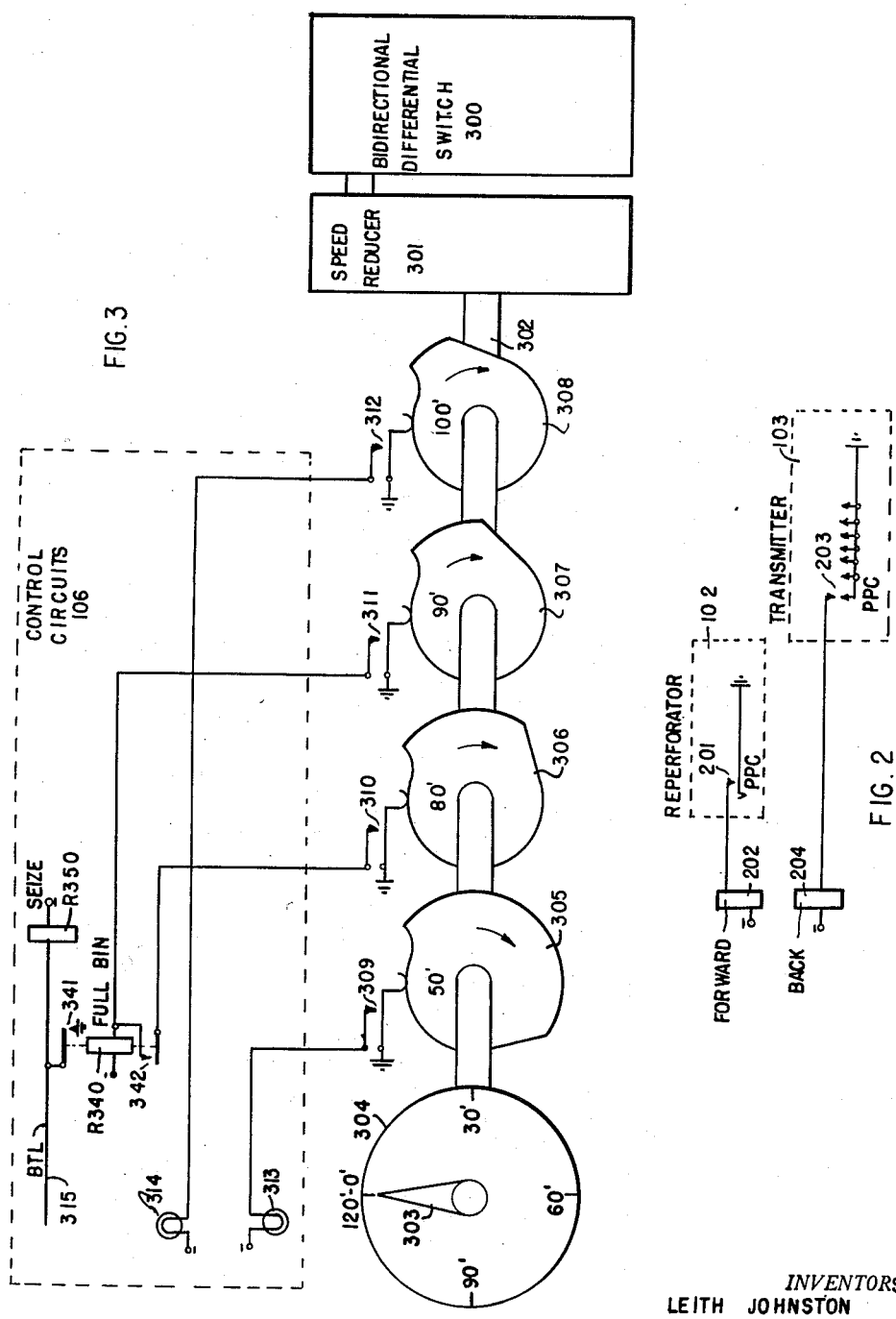

Feb. 19, 1957     L. JOHNSTON ET AL     2,782,254
TAPE MEASURING DEVICE FOR A TELETYPEWRITER
MESSAGE STORING UNIT

Filed Oct. 13, 1953     3 Sheets-Sheet 3

INVENTORS.
LEITH JOHNSTON
RICHARD C. STILES
BY *Wm Walter Owen*

ATTY.

United States Patent Office 2,782,254
Patented Feb. 19, 1957

2,782,254

TAPE MEASURING DEVICE FOR A TELETYPEWRITER MESSAGE STORING UNIT

Leith Johnston, Chicago, and Richard C. Stiles, La Grange, Ill., assignors to Automatic Electric Laboratories, Inc., Chicago, Ill., a corporation of Delaware Application October 13, 1953, Serial No. 385,824

10 Claims. (Cl. 178—17)

This invention relates in general to teletypewriter switching systems and more particularly to a tape measuring device for use in a message storing and re-transmitting unit in such a system.

Although the preferred embodiment of this invention has been adapted for use in a cross office unit of the automatic switching system shown in the co-pending application of R. C. Stiles, Serial No. 260,854, filed December 10, 1951, it will be understood that the invention herein may be utilized in other switching systems, manual or automatic.

It is an object of this invention to provide a means for keeping a continuous and very accurate record of the amount of tape stored in a bin placed between a reperforator and a transmitter in a teletypewriter switching system.

It is a further object of this invention to provide means to prevent the reperforator from receiving additional messages when the tape in the storage bin approaches maximum capacity.

A feature of this invention is the use of means including a bi-directional differential stepping switch to indicate at all times the amount of tape stored in the bin.

A further feature of this invention is the marking of a message storage unit busy when a predetermined amount of tape is stored in its storage bin.

A further feature of this invention is the maintenance of said busy marking until the stored tape reaches a predetermined amount less than said last-mentioned predetermined amount.

A further feature is the use of lights for indicating the storage of predetermined amounts of tape in the storage bin.

Additional features will be evident upon a perusal of the following description in which:

Fig. 2 shows the forward and back magnets of the bi-directional stepping switch together with their operating circuits;

Fig. 3 shows the bi-directional switch cam shaft together with the circuits and tape in storage scale which the shaft controls;

Figure 1:
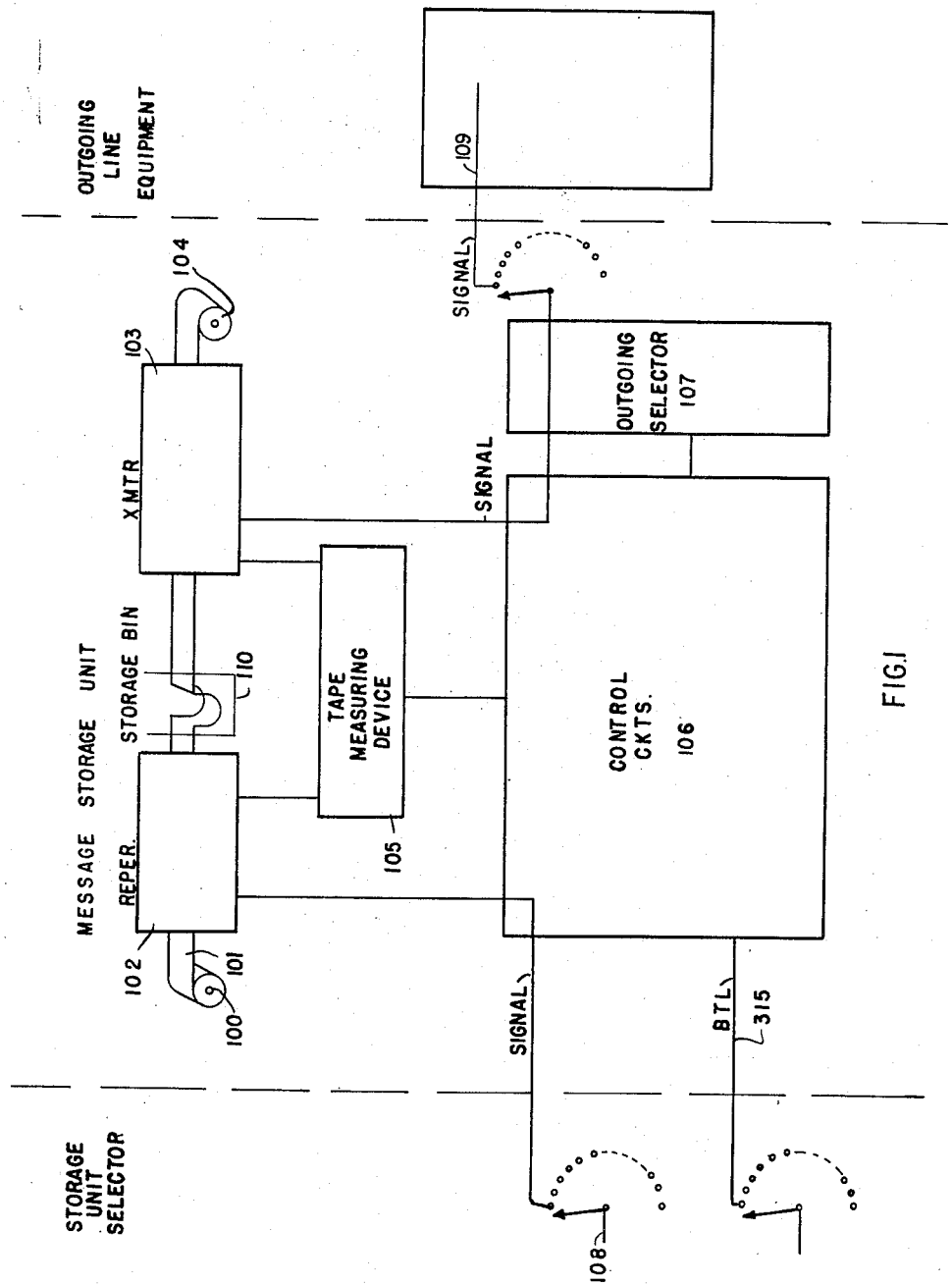
Fig. 1 shows in block diagram a simplified message storage unit together with a switch for selecting the storage unit and a switch for selecting an outgoing line.

In the preferred embodiment, a selecting switch is provided for seizing an available message storage unit. A message is transmitted by way of said selecting switch in the form of signals to a reperforator in the storage unit. The tape perforated in accordance with said signals is then fed into a storage bin in preparation for re-transmission of the message by a transmitter in the storage unit. After an outgoing line has been selected by an outgoing selector switch associated with the storage unit, the transmitter is controlled to automatically remove the perforated tape from the storage bin and to send the message over said outgoing line in accordance with the perforations.

A bi-directional stepping switch is provided in the message storage unit. A drive shaft in the switch is controlled to move one step in a certain direction for each cycle of operation of the reperforator and is further controlled to move one step in the opposite direction for each cycle of operation of the transmitter. The drive shaft is geared by way of a speed reducer to an indicator shaft upon which is mounted an indicator arm; which arm is moved over a scaled surface to show at all times the amount of tape in the storage bin. The indicator shaft is also provided with cams for operating contacts when predetermined amounts of tape are stored in the storage bin. Some of said contacts operate indicator lamps while others are provided to control a relay for marking the message storage unit busy as the amount of stored tape approaches the maximum capacity of the storage bin, thereby to prevent the transmission of additional messages to the busy message storage unit.

It is felt that a description of the control circuits of said copending application of Stiles, except for those circuits shown in Fig. 3 herein, need not be described in detail. Briefly, when a message has been received and recorded on a tape in the telegraph switching center UAC of said co-pending application, a director 200A (Fig. 2) is seized; and, in addition to other functions, the director searches for an available cross office unit, such as unit 3400, by way way of a cross office selector, such as selector 3300. When searching for an available cross office unit, the director makes a test over conductor C3301–BTL. If the cross office unit 3400 is available for receiving the message, battery potential will be found connected to the test conductor C3301–BTL through the seize relay R3870. If, however, other messages are stored in bin 3419 of cross office unit 3400 and bin 3419 is nearly full, the full bin relay R3860 will have been operated to connect ground potential to the test conductor C3301–BTL at contacts 3862, thereby to prevent seizure of cross office unit 3400 for transmission of another message thereto. It is to be noted that connecting ground potential to the test conductor C3301–BTL does not interrupt the transmission of a message to cross office unit 3400 if transmission has begun; it only prevents subsequent seizure of the cross office unit to prevent the transmission of additional messages thereto until sufficient tape has been removed from storage by an associated transmitter. The storage unit selector, the message storage unit, storage bin 110, conductor 315, seize relay R350, full bin relay R340 and its contacts 341 of the present application correspond respectively to cross office selector 3300, cross office unit 3400, storage bin 3419, conductor C3301–BTL, seize relay R3870, full bin relay R3860 and its contacts 3862 of said co-pending application. It is to be noted that several messages may be stored in the storage bin before the full bin relay will be operated to mark the message storage unit busy.

As previously noted, the preferred embodiment of the invention herein has been adapted for use in a cross office unit of the automatic telegraph switching system disclosed in the previously-mentioned co-pending application of R. C. Stiles.

The reperforator 102 shown in block diagram in Figs. 1 and 2 may be one of the type disclosed in the Lake Patent, No. 2,255,794, granted September 16, 1941, wherein perforations are produced on a tape e. g. 101 in response to signals of a telegraph message received by the reperforator. Each lateral row of perforations on the tape represent one character of a message, the reperforator mechanism stepping the tape sufficiently upon each cycle of operation to provide a small spacing between the lateral rows of perforations.

It will be noted that in the previously-mentioned co-pending application of R. C. Stiles that both a "tape reader" and a "transmitter" are used, each of which is substantially identical to the other; and that both are operated in unison. For purposes of the description herein it will be assumed that only a transmitter is used, which transmitter will be used to control the bi-directional stepping switch shown herein. Obviously the tape reader of said Stiles application could be used to control said switch since it is operated in unison with the transmitter.

The transmitter 103, shown in block diagram in Figs. 1 and 3, may be one of the type disclosed in the Goetz Patent No. 2,296,845, granted September 29, 1942, wherein signals are transmitted in accordance with the perforations on tape fed thereto. Each cycle of operation of the transmitter mechanism steps the tape the same distance as did each cycle of operation of the reperforator, that is the longitudinal distance between consecutive lateral rows of perforations.

With particular reference to Fig. 2, it is to be noted that contacts 201 are closed and opened once for each character recorded in the form of coded perforations on the tape 101 by the reperforator 102. As a result thereof, the forward magnet 202 will be operated to rotate the differential switch shaft one step in one direction for each character recorded on tape 101 by reperforator 102. In a similar manner, contacts 203 close and open once for each recorded character in the tape 101 which is sensed by transmitter 103, thereby to operate the back magnet 204 to rotate the switch shaft one step in the opposite direction for each character sensed by transmitter 103.

With reference to Fig. 3, it will be noted that the bi-directional differential switch 300, is coupled to a speed reducer 301, which reducer is in turn coupled to an indicator shaft 302. It is preferable that the shaft 302 be frictionally coupled to the speed reducer 301 to facilitate easy manual setting of the indicator arm 303 with respect to the tape in storage indicator scale 304. The arm 303 is rigidly mounted upon shaft 302, while the scale 304 is set upon a vertical sheet steel plate (not shown), which plate is secured to a horizontal sheet steel base (not shown). The speed reducer 301 and the switch 300 are also secured to said base. There are four cams 305, 306, 307 and 308 rigidly mounted on shaft 302. These cams are used to operate respectively the contacts 309, 310, 311 and 312.

That is, when the shaft 302 has been rotated clockwise to a position in which it indicates that 50 feet or more of tape are in storage, cam 305 will operate contacts 309. When contacts 309 are closed, an obvious circuit is completed for lighting the indicator lamp 313.

Similarly, when there is 80 feet or more of tape in storage, cam 306 will close contacts 310; and, when there is 90 feet or more of tape in storage, cam 307 will close contacts 311. Contacts 311 complete an obvious circuit for operating the full bin relay R340. R340 operates contacts 341 to complete an obvious circuit for operating the seize relay R350 and for marking the test lead 315 busy by placing ground potential on said lead. R340 also operates contacts 342 to complete an obvious holding circuit for itself, said holding circuit including contacts 310. As a result, the full bin relay R340 will remain operated to mark the message storage unit busy until less than 80 feet of tape are in storage, at which time cam 306 will permit contacts 310 to open, thereby to restore R340. In view of the foregoing, it will be seen that there will be no chattering of full bin relay R340 as there would be if R340 were both operated and restored by contacts 311 as the tape in storage went above or below 90 feet.

Similarly when there is 100 feet or more of tape in storage, cam 308 will operate contacts 312 to complete an obvious circuit for lighting the indicator lamp 314.

The indicator arm 303 and scale 304 give a continuous reading of the tape in storage.

*The bi-directional differential switch*

Referring to Fig. 3, it will be noted that the indicator arm 303 and scale 304 are at the front end of the tape measuring device, while the differential switch 300 is located at the rear end of the device.

Figure 4:
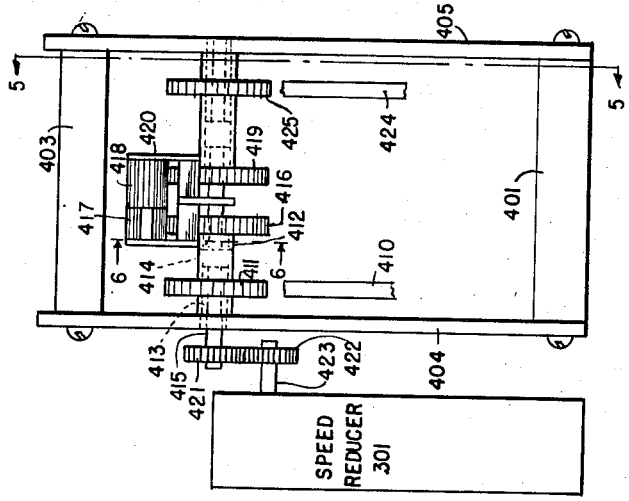

Fig. 4 shows a plan view of a portion of the differential switch to clearly show the ratchet wheels, the differential gear assembly, and the coupling of the switch shaft to the speed reducer 301.

Figure 5:
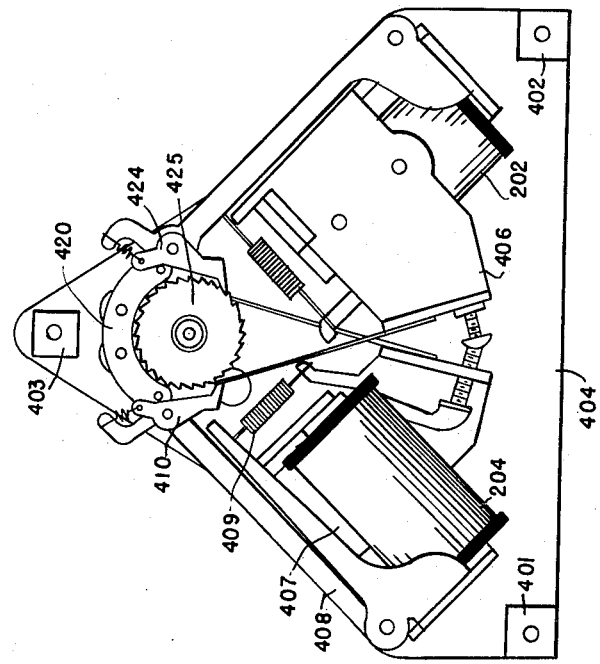
Figs. 4, 5 and 6 show mechanical details of the bi-directional differential switch.

Fig. 5 is an end view of the differential switch along line 5—5 and including the motor magnet assemblies.

Figure 6:
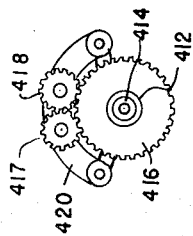

Fig. 6 is an end view of the differential gear assembly along line 6—6 to more clearly show the sun and planetary gears.

As previously noted, the tape measuring device is mounted on a sheet metal base (not shown). A pair of spacer bars 401 and 402 are secured to the base by means of screws. A pair of vertical end plates 404 and 405 are secured to the spacer bars. A third spacer bar 403 supports the upper ends of the end plates. To each of the inner surfaces of the end plates is secured a motor magnet assembly by means of its associated heel piece. That is heel piece 406 is secured to end plate 405, and heel piece 407 to end plate 404.

With particular reference to Fig. 5, the magnets are of a type well known in the art. For example, when the coil 204 of the back magnet is energized, it pulls the pivotally mounted armature 408 in a counter-clockwise direction against the tension of spring 409. The armature 408 raises the pawl 410 into engagement with the next succeeding tooth of ratchet wheel 411, shown in Fig. 4. When the coil 204 de-energizes, spring 409 pulls the armature 408 clockwise causing the pawl 410 to rotate the ratchet wheel 411 one step in a counter-clockwise direction (with respect to Fig. 5). Ratchet wheel 411 is rigidly secured to one end of a collar 412, which collar is rotatably mounted by means of bushings 413 and 414 on the switch drive shaft 415, said switch shaft being rotatably mounted on the end plates 404 and 405. A sun gear 416 is rigidly mounted on the other end of the collar 412; and, therefore, gear 416 rotates one step counter-clockwise with ratchet wheel 411.

When sun gear 416 rotates one step, it rotates planetary gear 417, with which it meshes, one step. Planetary gear 417 meshes with planetary gear 418 and causes it to rotate one step. At this moment, the sun gear 419 is in a stationary position so that planetary gear 418 must, when it rotates, move over sun gear 419 in a counterclockwise direction (with respect to direction in Fig. 5). When planetary gear 418 moves over sun gear 419 in this manner it carries the planetary gear 417 and the hub assembly 420 with it, the hub assembly 420 rotating the switch drive shaft 415, to which it is rigidly secured, in said counterclockwise direction (with respect to Fig. 5).

The drive shaft 415 rotates the speed reducer input shaft 423 in the opposite direction as a result of the gears 421 and 422 coupling the two shafts. The indicator shaft 302 coupled to the speed reducer is rotated in the same direction as the input shaft 423 and therefore in a clockwise direction (with respect to Fig. 5). This rotation of the indicator shaft by the back magnet 204 is counterclockwise with respect to Fig. 3. The scale 304 is marked with the numbers indicating the feet of tape in storage starting at a zero as shown and increasing to 120 in a clockwise direction. Therefore, it will be seen that, when the indicator shaft 302 rotates the indicator arm 303 in a counterclockwise direction (with respect to Fig. 3) in response to operations of the back magnet 204, the indicator arm 303 will rotate to a smaller number to indicate that a smaller amount of tape is stored in the bin 110.

In a similar manner, when the forward magnet is operated to cause its pawl 424 to rotate the ratchet wheel 425 in a clockwise direction (with respect to Fig. 5), the differential gear assembly rotates the drive shaft 415 in said clockwise direction, said drive shaft rotating the indicator shaft by way of the speed reducer so that the indicator arm rotates clockwise (with respect to Fig. 3) to indicate a greater amount of tape in storage.

When both magnets operate simultaneously the drive shaft 415 remains stationary.

While there has been described what is at present considered to be the preferred embodiment of the invention, it will be understood that various modifications may be made therein; and it is contemplated to cover in the appended claims all such modifications as fall within the true spirit and scope of the invention.

What is claimed is:

1. In a telegraph switching center having a message storing unit with an incoming conductor over which signals of a telegraph message are received, a recording mechanism in said unit operated in accordance with signals received over said conductor for producing a record thereof upon a recording medium, a bin for storing said medium upon which a record has been produced, a transmitting mechanism for withdrawing said medium from said bin and operated in accordance with the record on said medium for transmitting signals, means controlled by the operations of said recording and transmitting mechanisms for preventing said recording mechanism from accepting only additional messages as soon as a predetermined amount of medium is stored in said bin said predetermined amount of medium having a fixed direct ratio to the maximum storage capacity of said bin.

2. In a telegraph switching center having a message storing unit with an incoming conductor over which signals of a telegraph message are received, a recording mechanism in said unit operated in accordance with signals received over said conductor for producing a record thereof upon a recording medium, a bin for storing said medium upon which a record has been produced, a transmitting mechanism for withdrawing said medium from said bin and operated in accordance with the record on said medium for transmitting signals, means controlled by the operations of said recording and transmitting mechanisms for marking said message storing unit busy to prevent it from accepting signals only of additional messages as soon as a predetermined amount of medium is stored in said bin, said predetermined amount being a fixed percentage of the maximum capacity of said bin, said controlling means further removing said busy marking as soon as the amount of medium stored in said bin becomes less than a second lower predetermined percentage of capacity of said bin.

3. In a telegraph switching center having a message storing unit with an incoming conductor over which signals of a telegraph message are received, a recording mechanism in said unit operated in accordance with signals received over said conductor for producing a record thereof upon a recording medium, a bin for storing said medium upon which a record has been produced, a transmitting mechanism for withdrawing said medium from said bin and operated in accordance with the record on said medium for transmitting signals, means operated in response to the operations of the recording and transmitting mechanisms for keeping a continuous record of the linear amount of medium stored in the bin, means controlled by said last means for preventing said message storing unit from receiving only the signals of additional messages as soon as a predetermined linear amount of medium is stored in the bin.

4. In a telegraph switching center having a message storing unit with an incoming conductor over which signals of a telegraph message are received, a recording mechanism in said unit operated in accordance with signals received over said conductor for producing a record thereof upon a recording medium, a bin for storing said medium upon which a record has been produced, a transmitting mechanism for withdrawing said medium from said bin and operated in accordance with the record on said medium for transmitting signals, means operated in response to the operations of the recording and transmitting mechanisms for keeping a continuous record of the linear amount of medium stored in the bin, means for preventing said message storing unit from receiving only the signals of additional messages and means controlled by said first means for rendering said preventing means effective as soon as a predetermined linear amount of medium is stored in the bin and for thereafter rendering said preventing means ineffective only after the amount of stored medium is reduced below a predetermined linear amount less than said first mentioned predetermined amount.

5. In a telegraph system having a message storage unit with an incoming conductor over which signals of a telegraph message are received and said unit having a recording mechanism operated in accordance with said received signals to produce a record thereof upon a tape, a storage bin for storing record-bearing tape, said storage bin having a known maximum capacity, a transmitter operated in accordance with said stored record for transmitting signals and means for removing the tape from the storage bin and for feeding it to the transmitter, an indicator for indicating the amount of tape stored in said bin at all times, means operated in response to each operation of the recording mechanism for controlling said indicator in one manner to indicate the receipt of additional tape by the storage bin, means operated in response to each operation of the transmitter for controlling said indicator in a different manner to indicate the removal of tape from storage, means for preventing said recording mechanism from receiving only the signals of additional messages, means controlled by said indicator for rendering said preventing means effective as soon as an amount of tape having a predetermined relationship to said maximum capacity is stored in said storage bin, and means controlled by said indicator for thereafter rendering said preventing means ineffective only after the amount of stored tape is reduced to a predetermined amount less than said first-mentioned predetermined amount.

6. In an automatic teletypewriter switching center having a message storage unit with an incoming conductor over which signals of a telegraph message are received and said unit having a recording mechanism operated in accordance with said received signals to produce a record thereof upon a tape, a storage bin for storing a substantial amount of record-bearing tape, a transmitter operated in accordance with said stored record for transmitting signals and a means for removing the tape from the storage bin and for directing it to the transmitter, a bi-directional differential stepping switch having a pair of step by step driving elements, a shaft and a differential gear arrangement coupling said shaft to said driving elements, circuit means in said switch for operating one of said driving elements in response to each operation of the recording mechanism to cause said one driving element to move said shaft one step in one direction, circuit means in said switch for operating the other driving element in response to each operation of the transmitter to cause said other driving element to move the shaft one step in the other direction, means controlled by said shaft for indicating the amount of tape stored in the storage bin at all times, means for preventing said recording means from receiving only the signals of additional messages, means controlled by said indicating means for rendering said preventing means effective as soon as the amount of tape stored exceeds a predetermined percentage of the capacity of the storage bin, and means controlled by said indicating means for thereafter rendering said preventing means ineffective only after the amount of stored tape is reduced below a predetermined percentage of storage capacity appreciably less than said first-mentioned predetermined percentage.

7. In an automatic teletypewriter switching center having a message storage unit with an incoming conductor over which signals of a telegraph message are received and said unit having a recording mechanism operated in accordance with said received signals to produce a record thereof upon a tape, a storage bin for record-bearing tape, a transmitter operated in accordance with said stored record for transmitting signals and a means for removing the tape from the storage bin and supplying it to the transmitter, means for indicating the amount of tape stored in said bin, means operated in response to each operation of the recording mechanism for controlling said indicator means in one manner to indicate the receipt of additional tape by the storage bin, means operated in response to each operation of the transmitter for controlling said indicator means in a different manner to indicate the removal of tape from storage, means for marking said message storage unit busy to prevent the receipt of only the signals of additional messages, and means controlled by said storage indicating means for operating said last means when a predetermined linear amount of tape is stored in the storage bin.

8. The combination claimed in claim 7 together with means controlled by said storage indicator for again operating said marking means to remove said busy mark after a predetermined linear amount of tape is removed from the storage bin.

9. In a teletypewriter system having a plurality of message storage units, an automatic selecting switch having an incoming conductor over which signals of a telegraph message are received together with means for selecting one of said storage units for receiving the signals of said message, a reperforator in each of said storage units operated in response to received signals to produce a record thereof upon a tape, a storage bin in each message storage unit for storing tape upon which a record has been produced by the respective reperforator, a transmitter in each message storage unit operated according to the record stored in the respective storage bins for transmitting signals and a means for removing the tape from the storage bin and directing it to the transmitter, means in each message storage unit for registering the amount of tape in the respective storage bins, means associated with each of said registering means and operated in response to each operation of the respective reperforator for controlling said registering means in one manner to register the receipt of additional tape by the respective storage bin, and means associated with each registering means and operated in response to each operation of the respective transmitter for controlling said registering means in another manner to register the removal of tape from the respective storage bin, means in each message storage unit for marking the storage unit busy to prevent its selection for the receipt of additional messages, and means in each message storage unit controlled by the respective registering means for rendering said last means effective as soon as a predetermined linear amount of tape is stored in the respective storage bin.

10. The combination as claimed in claim 9 together with means in each message storage unit controlled by said registering means for rendering said marking means ineffective only after a predetermined linear amount of tape less than said first-mentioned predetermined linear amount remains stored in the respective storage bin.

References Cited in the file of this patent
UNITED STATES PATENTS

| | | |
|---|---|---|
| 923,511 | Greenbaum | June 1, 1909 |
| 1,202,952 | Adams | Oct. 31, 1916 |
| 2,441,207 | Potts | May 11, 1948 |
| 2,482,610 | Burn | Sept. 20, 1949 |
| 2,569,443 | Bacon | Oct. 2, 1951 |
| 2,575,329 | Blanton et al. | Nov. 20, 1951 |